United States Patent [19]

Riedhammer

[11] 4,388,941

[45] Jun. 21, 1983

[54] APPARATUS FOR PRODUCING A ROTARY SPEED-DEPENDENT CONTROL PRESSURE

[75] Inventor: Josef Riedhammer, Horb, Fed. Rep. of Germany

[73] Assignee: Danfoss A/S, Nordborg, Denmark

[21] Appl. No.: 318,684

[22] Filed: Nov. 5, 1981

[30] Foreign Application Priority Data

Nov. 6, 1980 [DE] Fed. Rep. of Germany ....... 3041873

[51] Int. Cl.³ ............................................. F15B 5/00
[52] U.S. Cl. ..................................... 137/82; 137/117
[58] Field of Search ................. 137/117; 73/502, 521; 74/336 R, 752 C, 862; 192/103 F

[56] References Cited

U.S. PATENT DOCUMENTS

| | | | |
|---|---|---|---|
| 3,234,957 | 2/1966 | Allen | 137/117 |
| 3,532,106 | 10/1970 | Greune | 137/117 |
| 3,908,377 | 9/1975 | Riedhammer | 60/445 |

FOREIGN PATENT DOCUMENTS

2826613  6/1978  Fed. Rep. of Germany ...... 137/117

Primary Examiner—Martin P. Schwadron
Assistant Examiner—James R. Shay
Attorney, Agent, or Firm—Wayne B. Easton

[57] ABSTRACT

The invention relates to a device for producing a control pressure which corresponds to a rotary speed imparted to a shaft of a pump which is a part of the device. The device includes a measuring orifice formed by a fixed throttle and a control orifice formed by piston arrangement operating as a controlled throttle. The controlled throttle is responsive to oppositely acting pressures from opposite sides of the fixed throttle. The controlled throttle is in series with a fixed discharge throttle and the control pressure is tapped from between the controlled throttle and the discharge throttle.

4 Claims, 1 Drawing Figure

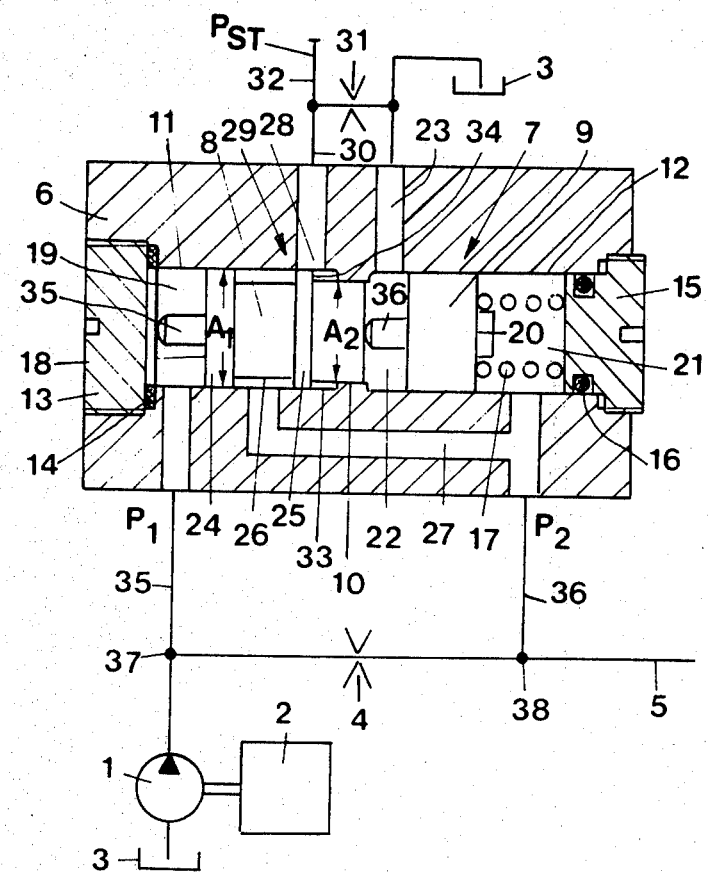

APPARATUS FOR PRODUCING A ROTARY SPEED-DEPENDENT CONTROL PRESSURE

The invention relates to an apparatus for producing a rotary speed-dependent control pressure, comprising an auxiliary pump driven at the rotary speed, a fixed measuring throttle disposed in a main conduit, a piston arrangement with two oppositely directed pressure faces respectively subjected to the pressure in front of and behind the measuring throttle, and a spring which acts against the first-mentioned pressure, a throttle Such apparatuses are, for example, used in hydrostatic gear for controlling an adjustable main pump in dependence on the rotary speed of the diesel engine driving same. However, it can also be used for other purposes, for example when the speed of an engine or the speed of a vehicle is to be indicated by a pressure.

In a known apparatus of this kind (DE-OS No. 20 08 078), the piston arrangement comprises a hollow piston in which the measuring throttle is arranged at the base on the outlet side. In the circumferential wall of the hollow piston upstream of this measuring throttle, there is a bore which co-operates with a bore in the housing to form the controlled throttle. A certain pressure drop at the measuring throttle leads to a defined cross-section at the controlled throttle. The controlled throttle and the outlet throttle form a pressure divider from which the control pressure can be tapped.

In this construction, the control pressure is only a very inaccurate reproduction of the rotary speed. Since only the spring opposes the pressure drop, the hollow piston executes a comparatively large stroke within the range of rotary speed, with the result that the controlled throttle and thus the outlet throttle have comparatively low resistances, the branch flow is large and corresponding losses occur. Since the entire flow fed by the auxiliary pump extends through the piston arrangement, additional throttle losses occur beyond the measuring throttle. In addition, the measuring throttle is traversed by only part of the volume fed by the auxiliary pump. The other part flows off previously through the branch conduit.

In another known apparatus (DE-AS No. 22 47 437), the hollow piston is additionally provided with a smaller pressure face which is subjected to the control pressure and acts in the same means as the spring. The control pressure is thus maintained by a two-point control in that the conduit at control pressure is alternately connected to the main conduit in front of the measuring throttle and to a discharge conduit. The stroke of the hollow piston is small. However, there is an irregular control pressure signal which can lead to instability. It is also already known in an apparatus of the last-mentioned kind to bring the control conduit into communication with the main conduit behind the measuring throttle (Verstellpumpenregelung DA by Messrs. Hydromatik GmbH, of Ulm).

The invention is based on the problem of providing an apparatus of the aforementioned kind which has the least possible losses and delivers a smooth control pressure signal which proportionally follows changes in the pressure drop at the throttle.

This problem is solved according to the invention in that the measuring throttle is disposed beyond the piston arrangement and the piston arrangement additionally comprises a smaller pressure face which is subjected to the control pressure and acts in the same sense as the spring.

In this construction, the additional pressure face subjected to the control pressure ensures a close proportionally between changes in the pressure drop at the measuring throttle and changes in the control pressure. The required stroke of the piston arrangement is small; consequently, the controlled throttle and thus the discharge throttle can have a high resistance with the result that the branch flow losses are low. Since the main flow extends beyond the piston arrangement, main flow losses as a result of unnecessary throttling are also low. The pressure signal is smooth because a small branch flow flows continuously through the controlled throttle at the discharge throttle. Another advantage is that the measuring throttle can be provided completely independently of the piston arrangement. This enables pipe connections to be saved for the main conduit. If the rotary speed of an internal combustion engine is to be represented by the control pressure, any desired auxiliary pump connected to this engine and with a constant supply volume per revolution be employed to produce the pressure drop at the measuring orifice.

The rotary speed of the auxiliary pump is very accurately taken into account if the entire volume fed by this auxiliary pump flows through the measuring throttle. This is already achieved if the branch conduit already branches off from the main conduit in front of the measuring throttle because the amounts of branch flow are small. However, it is more favourable if the branch conduit does not branch off from the main conduit until after the measuring throttle. It is also possible to feed the branch conduit from a pump other than the auxiliary pump.

In particular, the piston arrangement may comprise a solid piston. Such a solid piston is easier to make than a hollow piston and also takes up less space.

If, to form the controlled throttle, the piston arrangement is provided with a first control orifice and the associated housing bore with a second control orifice, which come into registry as the pressure drop at the measuring throttle rises, it is favourable for the first control orifice to be formed by an annular groove of the solid piston. Such an annular groove is easy to make and easy to connect to the branch conduit.

The piston arrangement advantageously comprises a stepped piston having an end face subjected to the pressure in front of the measuring throttle, an annular groove which is separated therefrom by a collar and is fed with the pressure behind the measuring throttle, and a further collar of which the annular face remote from the annular groove is subjected to the control pressure, and a further piston which nonpositively abuts the stepped piston and is subjected at the opposite end face by the pressure behind the measuring throttle and by the spring. The sub-division into two pistons simplifies manufacture of the bore and assembly of the apparatus.

Further simplification is obtained in that a common housing aperture is provided to supply the annular face with control pressure and as a control orifice for forming the controlled throttle.

Any leakage fluid can be readily eliminated if the space between the stepped piston and the further piston is connected to the discharge.

The invention will now be described in more detail with reference to an example illustrated in the drawing. The single drawing is a block diagram with a diagrammatic longitudinal section through an apparatus according to the invention.

An auxiliary pump 1 is connected to an internal combustion engine 2 of which the rotary speed is to be represented by a control pressure $P_{st}$. The auxiliary pump conveys pressure fluid from a tank 3 through a measuring orifice 4 disposed in a main conduit 5. The pressure in front of the measuring orifice is $p_1$ and the pressure behind the measuring orifice is $p_2$. The pressure drop ($p_1-p_2$) across the measuring orifice 4 depends on the quantity conveyed by the auxiliary pump 1 and therefore a measure of the rotary speed of this pump.

A piston arrangement 7 in a housing 6 consists of a stepped piston 8 and an additional piston 9 which are disposed in respective bore sections 11 and 12 separated by an internal collar 10. The bore section 11 is closed by a screw 13 with the aid of a seal 14. The bore section 12 is closed by a screw 15 with a seal 16. The screw 15 serves as a counterbearing for a spring 17 biasing the piston arrangement 7 and it can be axially adjusted to set predetermined prestressing of the spring.

The stepped piston 8 has an end face 18 of a size $A_1$ facing a chamber 19 which is at the pressure $p_1$ and the additional piston has an end face 20 of the same size facing a chamber 21 at the pressure $p_2$. The space 22 between the two pistons communicates with the tank 3 by way of a conduit 23. Between the two collars 24 and 25, an annular groove 26 is provided in the stepped piston 8 that is likewise supplied with the pressure $p_2$ by way of a control conduit 27. A control orifice 28 in the housing 6 forms a controlled throttle 29 together with the collar 25. This control orifice is disposed in series with a discharge throttle 31 in a branch conduit 30 leading to the tank 3. The discharge throttle is preferably fixed but could also be adjustable. Between the two throttles 29 and 31 there is a tapping 32 at which the control pressure $p_{st}$ can be derived. The control orifice 28 also supplies a chamber 33 with the control pressure $p_{st}$ so that a smaller pressure face 34 acting in the same direction as the spring 17 is subjected to the control pressure $p_{st}$. Abutments 35 and 36 at the pistons 8 and 9 define a rest position.

By dividing the piston arrangement 7 into two, manufacture is easy because the bore section 11 can be drilled from the left-hand side and the bore section 12 from the right-hand side. The stepped piston 8 and additional piston 9 can then be introduced into the bore sections even if the latter are not absolutely coaxial. Thereafter, the two bore sections 13 and 15 are closed.

In operation, if the axuiliary pump 1 turns at a predetermined speed, the piston arrangement 7 assumes a condition of equilibrium at which the following equation obtains:

$$(p_1-p_2) \cdot A_1 = p_{st}(A_1-A_2) + F$$

wherein $A_1$ is the largest diameter of both pistons 8 and 9, $A_2$ is the diameter of the stepped piston 8 within the collar 10, $p_1$ is the pressure in front of the measuring throttle 4, $p_2$ is the pressure behind the measuring throttle 4, $p_{st}$ is the control pressure and F is the force of spring 17.

As long as the pressure drop times the piston area $A_1$ cannot overcome the prestressing force of the spring 17, the controlled throttle 29 remains closed and the control pressure corresponds to the tank pressure. If, however, the pressure drop increases, the controlled throttle 29 opens at a rotary speed predetermined by the prestressing force of the spring 17, whereupon the control pressure rises until the aforementioned condition of equilibrium has been achieved. Changes in the pressure drop lead to proportionally amplified changes in the control pressure. If the prestressing force of the spriny 17 is adjusted, one can ensure that the same control pressure is obtained at a different rotary speed.

The main conduit 5 can be at a spacing from the housing 6. It is merely necessary to install conduits 35 and 36 of smaller cross-section from the branching off points 37 and 38 to the housing 6. It is also possible to separate the passage 27 from the conduit 36 and feed it by means of a pump other than the auxiliary pump 1.

I claim:

1. A device for producing a rotary speed responsive control pressure, comprising, a housing and piston means in a bore formed in said housing, said piston means having first and second faces on opposite sides thereof slidably disposed therein, a pump driveable over a range of rotary speeds, said pump having an output conduit, a measuring throttle disposed in said output conduit with upstream and downstream sides thereof having respective fluid communication with and exerting first and second pressures in end chambers defined by said faces, spring means in said second chamber biasing said piston means in a direction opposite to said first pressure, control conduit means in said housing intersecting said bore and having upstream and downstream ends relative to said bore, said upstream end of said control conduit means having fluid communication with said downstream side of said measuring throttle means, said piston means having edge means cooperable with downstream portion of said control conduit means to form variable control throttle means, discharge throttle means on the downstream side of said control conduit means, and a tapping for said control pressure in said control conduit between said variable control throttle means and said discharge throttle means.

2. A device according to claim 1 including collar means upon which said edge means is formed, said collar means being subjected to said control pressure on both sides thereof when in a throttling position, said collar means having a smaller effective area on the downstream side thereof than on the upstream side thereof.

3. A device according to claim 1 wherein said piston means includes a solid piston member.

4. A device according to claim 2 wherein said piston means includes a collar in spaced relation to said collar means to form an annular groove having fluid communication with said upstream and downstream ends of said control conduit means.

* * * * *